United States Patent
Tapley et al.

(10) Patent No.: US 11,514,508 B2
(45) Date of Patent: *Nov. 29, 2022

(54) DISPLAYING A VIRTUAL ENVIRONMENT OF A SESSION

(71) Applicant: eBay Inc., San Jose, CA (US)

(72) Inventors: John Tapley, San Jose, CA (US); Skot Leach, Pleasanton, CA (US); David Beach, Santa Cruz, CA (US)

(73) Assignee: eBay Inc., San Jose, CA (US)

( * ) Notice: Subject to any disclaimer, the term of this patent is extended or adjusted under 35 U.S.C. 154(b) by 154 days.

This patent is subject to a terminal disclaimer.

(21) Appl. No.: 17/033,590

(22) Filed: Sep. 25, 2020

(65) Prior Publication Data

US 2021/0012414 A1 Jan. 14, 2021

Related U.S. Application Data

(63) Continuation of application No. 14/712,829, filed on May 14, 2015, now Pat. No. 10,825,081.

(51) Int. Cl.
*G06Q 30/00* (2012.01)
*G06Q 30/06* (2012.01)
(Continued)

(52) U.S. Cl.
CPC ..... *G06Q 30/0643* (2013.01); *G06F 3/04815* (2013.01); *G06F 3/04842* (2013.01); *G06Q 30/0633* (2013.01)

(58) Field of Classification Search
None
See application file for complete search history.

(56) References Cited

U.S. PATENT DOCUMENTS 6,026,377 A * 2/2000 Burke .................. G06Q 30/02
715/810
6,480,204 B1 11/2002 Tognazzini et al.
(Continued)

FOREIGN PATENT DOCUMENTS

CA    2403006 A1 *  9/2001  ............ G06Q 30/06
CA    2403006 A1     9/2001
(Continued)

OTHER PUBLICATIONS

Alessandro Febretti et al; "Omegalib: a Multi-View Application Framework for Hybrid Reality Display Environments"; 2014; Electronic Visualization Laboratory, University of Illinois at Chicago (Year: 2014).*

(Continued)

*Primary Examiner* — Michelle T Kringen
*Assistant Examiner* — Norman Donald Sutch, Jr.
(74) *Attorney, Agent, or Firm* — Holland & Hart LLP

(57) ABSTRACT

In various example embodiments, a system and method for facilitating display of virtual content are presented. A session that displays two-dimensional (2D) content of one or more items available for sale is presented on a first device of a user. A second device of the user is detected, the second device being able to display three-dimensional (3D) content of the one or more items available for sale. 3D content of the one or more items available for sale is retrieved. Display of the 3D content on the second device is caused, the 3D content selectable by the user to perform interactions with the 3D content. An indication of the user performed interactions is received and processed. A result that depicts the user performed interactions as being processed is displayed on the first device of the user.

18 Claims, 10 Drawing Sheets

(51) Int. Cl.
  *G06F 3/04815* (2022.01)
  *G06F 3/04842* (2022.01)

(56) References Cited

U.S. PATENT DOCUMENTS

| | | | |
|---|---|---|---|
| 6,917,370 | B2 | 7/2005 | Benton |
| 7,696,992 | B2 | 4/2010 | Gyorfi et al. |
| 8,443,300 | B2 | 5/2013 | Nankani |
| 8,497,859 | B1 | 7/2013 | Hickman et al. |
| 9,875,480 | B2 | 1/2018 | Xiong et al. |
| 10,825,081 | B2 | 11/2020 | Tapley et al. |
| 2001/0019337 | A1 | 9/2001 | Kim |
| 2002/0010655 | A1* | 1/2002 | Kjallstrom ......... G06Q 30/0625 705/26.62 |
| 2009/0043674 | A1 | 2/2009 | Minsky et al. |
| 2009/0132309 | A1 | 5/2009 | Marin |
| 2009/0138375 | A1* | 5/2009 | Schwartz .......... G06Q 30/0601 705/26.1 |
| 2010/0097445 | A1 | 4/2010 | Hirama et al. |
| 2010/0185514 | A1 | 7/2010 | Glazer et al. |
| 2010/0225604 | A1 | 9/2010 | Homma et al. |
| 2011/0035299 | A1 | 2/2011 | Casey |
| 2012/0086728 | A1 | 4/2012 | Mcardle et al. |
| 2012/0303442 | A1 | 11/2012 | Patwa et al. |
| 2014/0007205 | A1 | 1/2014 | Oikonomou |
| 2014/0058885 | A1 | 2/2014 | Matthew |
| 2014/0067624 | A1 | 3/2014 | Babu |
| 2014/0201029 | A9 | 7/2014 | Plattsmier et al. |
| 2014/0222916 | A1 | 8/2014 | Foley et al. |
| 2014/0337149 | A1 | 11/2014 | Ke et al. |
| 2014/0365272 | A1* | 12/2014 | Hurewitz .......... G06Q 30/0201 705/7.29 |
| 2015/0026012 | A1* | 1/2015 | Gura ................. G06Q 30/0643 705/26.62 |
| 2015/0058102 | A1 | 2/2015 | Christensen et al. |
| 2015/0058164 | A1 | 2/2015 | Soon-Shiong |
| 2015/0084837 | A1 | 3/2015 | Mese |
| 2015/0120496 | A1 | 4/2015 | Watson |
| 2015/0213496 | A1 | 7/2015 | Mcdevitt et al. |
| 2016/0155187 | A1 | 6/2016 | Paulrajan et al. |
| 2016/0335712 | A1 | 11/2016 | Tapley et al. |
| 2019/0037611 | A1 | 1/2019 | Renn et al. |

FOREIGN PATENT DOCUMENTS

| | | |
|---|---|---|
| CN | 103080928 A | 5/2013 |
| CN | 103093543 A | 5/2013 |
| CN | 103797472 A | 5/2014 |
| CN | 104123664 A | 10/2014 |
| CN | 107533428 A | 1/2018 |
| KR | 10-2002-0084148 A | 11/2002 |
| KR | 10-2009-0094526 A | 9/2009 |
| WO | 02/057881 A2 | 7/2002 |
| WO | 2016/183476 A1 | 11/2016 |

OTHER PUBLICATIONS

"Virtual Desktop," Retrieved from the Internet URL: https://www.vrdesktop.net/, Retrieved on Nov. 19, 2020, 3 pages.
Response to First Action Interview- Pre-Interview Communication filed on Oct. 2, 2017, for U.S. Appl. No. 14/712,829, dated Aug. 1, 2017, 1 page.
Response to Office Action filed on Jul. 9, 2020, for Chinese Patent Application No. 201680028037.2, dated Feb. 26, 2020, 10 pages (5 pages of official copy & 5 pages of English translation of claims).
Response to Office Action filed on Oct. 26, 2020, for Chinese Patent Application No. 201680028037.2, dated Aug. 14, 2020, 14 Pages (10 pages of Official Copy & 4 Pages of English translation Claims).
Office Action Received for Chinese Patent Application No. 201680028037.2, dated Aug. 14, 2020, 16 pages (6 pages of Official Copy and 10 pages of English Translation).
Summons to Attend Oral Proceedings received for European Patent Application No. 16793629.3, dated Oct. 29, 2020, 11 Pages.
Response to Office Action Filed on Aug. 10, 2020, for Korean Patent Application No. 10-2017-7036153, dated Jul. 11, 2020, 24 Pages (19 pages of official copy & 5 pages of English translation of claims).
Applicant Initiated Interview Summary Received for U.S. Appl. No. 14/712,829 dated Jan. 30, 2020, 3 Pages.
Applicant Initiated Interview Summary received for U.S. Appl. No. 14/712,829, dated Feb. 14, 2019, 3 pages.
Examiner Initiated Interview Summary Received for U.S. Appl. No. 14/712,829, dated May 21, 2020, 2 pages.
Final Office Action received for U.S. Appl. No. 14/712,829, dated Apr. 13, 2018, 18 pages.
Final Office Action received for U.S. Appl. No. 14/712,829, dated May 30, 2019, 24 pages.
First Action Interview- Pre-Interview Communication received for U.S. Appl. No. 14/712,829, dated Aug. 1, 2017, 21 pages.
First Action Interview-Office Action Summary received for U.S. Appl. No. 14/712,829, dated Nov. 30, 2017, 23 pages.
Non Final Office Action Received for U.S. Appl. No. 14/712,829, dated Nov. 21, 2019, 26 pages.
Non-Final Office Action received for U.S. Appl. No. 14/712,829, dated Nov. 1, 2018, 20 pages.
Notice of Allowability received for U.S. Appl. No. 14/712,829, dated Jul. 27, 2020, 2 pages.
Notice of Allowance received for U.S. Appl. No. 14/712,829, dated Jun. 29, 2020, 18 Pages.
Response to First Action Interview—Office Action Summary filed on Jan. 29, 2018, for U.S. Appl. No. 14/712,829, dated Nov. 30, 2017, 18 pages.
Response to Final Office Action Filed on Aug. 29, 2019, for U.S. Appl. No. 14/712,829,dated May 30, 2019, 16 pages.
Response to Final Office Action filed on Jun. 12, 2018, for U.S. Appl. No. 14/712,829, dated Apr. 13, 2018, 10 pages.
Response to Non-Final Office Action filed on Feb. 21, 2020 for U.S. Appl. No. 14/712,829, dated Nov. 21, 2019, 17 pages.
Response to Non-Final Office Action filed on Mar. 5, 2019, for U.S. Appl. No. 14/712,829, dated Nov. 1, 2018, 14 pages.
Result of consultation Received for European Patent Application No. 16793629.3, dated Mar. 23, 2021, 13 Pages.
Office Action Received for Korean Patent Application No. 10-2021-7003761, dated Apr. 16, 2021, 9 pages (2 Pages of English translation & 7 Pages of Official Copy).
EPO Decision to refuse Received for European Patent Application No. 16793629.3, dated Jun. 4, 2021, 18 Pages.
Decision of Rejection Received for Chinese Patent Application No. 201680028037.2, dated May 7, 2021, 6 pages (1 Page of English translation & 5 Pages of Official Copy).
U.S. Appl. No. 14/712,829, filed May 14, 2015.
Final Office Action Received for Korean Patent Application No. 10-2021-7003761, dated Oct. 12, 2021, 6 Pages (2 Pages of English Translation & 4 Pages of Official Copy).
International Written Opinion received for PCT Application No. PCT/US2016/032438, dated Aug. 16, 2016, 8 pages.
Extended European Search Report for European Patent Application No. 16793629.3 dated Jan. 30, 2018, 9 pages.
Office Action Received for Korean Patent Application No. 10-2017-7036153, dated Jun. 11, 2020, 13 pages (7 Pages of Official Copy and 6 Pages of English Translation).
Office Action Received for Korean Patent Application No. 10-2017-7036153, dated Mar. 26, 2020, 6 pages (3 pages of Official Copy and 3 pages of English Translation).
Office Action received for Korean Patent Application No. 10-2017-7036153, dated Mar. 29, 2019, 9 pages (4 pages of English Translation and 5 pages of Official copy).
Office Action Received for Korean Patent Application No. 10-2017-7036153, dated Oct. 25, 2019, 11 pages (6 pages of Official Copy and 5 pages of English Translation).
Office Action Response filed on Dec. 23, 2019 for Korean Patent application No. 10-2017-7036153, dated Oct. 25, 2019, 24 pages (19 pages of Official copy & 5 pages of English Translation of claims).

(56) References Cited

OTHER PUBLICATIONS

Response to Final Office Action Filed on May 21, 2020, for Korean Patent Application No. 10-2017-7036153,dated Mar. 26, 2020, 16 pages (11 pages of official copy & 5 pages of English translation of Claims).
Febretti et al., "Omegalib: a Multi-View Application Framework for Hybrid Reality Display Environments", Electronic Visualization Laboratory, University of Illinois at Chicago, 2014, 6 pages.
Response to Office Action filed on May 29, 2019, for Korean Patent Application No. 10-2017-7036153, dated Mar. 29, 2019, 41 pages (10 pages of English Translation and 31 pages of Official copy).
International Preliminary Report on Patentability received for PCT Application No. PCT/US2016/032438, dated Nov. 23, 2017, 10 pages.
Office Action Received for Chinese Patent Application No. 201680028037.2, dated Feb. 26, 2020, 20 pages (9 pages of Official Copy and 11 pages of English Translation).
Response to Extended European Search Report filed on Aug. 15, 2018 for European Patent Application No. 16793629.3 dated Jan. 30, 2018, 17 pages.
Communication Pursuant to Article 94(3) EPC received For European Patent Application No. 16793629.3, dated Feb. 11, 2020, 7 pages.
Response to Communication Pursuant to Article 94(3) Filed on Apr. 29, 2020, for European Patent Application No. 16793629.3, dated Feb. 11, 2020, 10 pages.
Final Office Action received for Korean Patent Application No. 10-2017-7036153, dated Dec. 4, 2020, 7 pages (3 pages of Official Copy and 4 pages of English Translation).
Office Action Received for Chinese Patent Application No. 201680028037.2 dated Jan. 4, 2021, 6 pages Official Copy Only).
International Search Report received for PCT Application No. PCT/US2016/032438, dated Aug. 16, 2016, 2 pages.
Notice of Allowance Received for Korean Patent Application No. 10-2021-7003761, dated Jan. 10, 2022, 8 Pages(3 pages of official copy & 5 pages of claims).

* cited by examiner

DISPLAYING A VIRTUAL ENVIRONMENT OF A SESSION

CROSS REFERENCE TO RELATED APPLICATIONS

This application is a Continuation of application Ser. No. 14/712,829 filed on May 14, 2015, entitled "DISPLAYING A VIRTUAL ENVIRONMENT OF A SESSION," the entire contents of this application is incorporated herein by reference in its entirety.

TECHNICAL FIELD

Embodiments of the present disclosure relate generally to data processing and, more particularly, but not by way of limitation, to facilitating display of a virtual environment of a session.

BACKGROUND

Conventionally, a user, during a browsing session, may view an item page hosted by a network commerce system. The item page includes content that is displayed on a device of the user.

BRIEF DESCRIPTION OF THE DRAWINGS

Various ones of the appended drawings merely illustrate example embodiments of the present disclosure and cannot be considered as limiting its scope.

The headings provided herein are merely for convenience and do not necessarily affect the scope or meaning of the terms used.

DETAILED DESCRIPTION

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

In various example embodiments, a system presents a session that displays two-dimensional (2D) content on a first device of a user. For instance, the user may be viewing an item page of one or more items available for sale on the device. Also, the system may detect a second device of the user that is capable of viewing three-dimensional (3D) content corresponding to the session. Upon detection of the second device, the system retrieves the 3D content and causes display of the 3D content on the second device of the user. The 3D content corresponding to the session includes 3D objects representative of information on a network of the system. In some instances, the information includes items available for sale. Moreover, the 3D content is selectable by the user to perform interactions with the 3D content. The system may process the user interactions with the 3D content and display a result, on the first device, that depicts the user interactions with the 3D content as being processed. In other words, the actions performed by the user while viewing the 3D content on the second device are also reflected in the session that displays the 2D content. This allows for a smooth transition between the 2D session displayed on the first device of the user and the 3D session displayed on the second device of the user.

Accordingly, one or more of the methodologies discussed herein may obviate a need for a user to interact with two separate sessions, which may have the technical effect of reducing computing resources used by one or more devices within the system. Examples of such computing resources include, without limitation, processor cycles, network traffic, memory usage, storage space, and power consumption.

Figure 1:
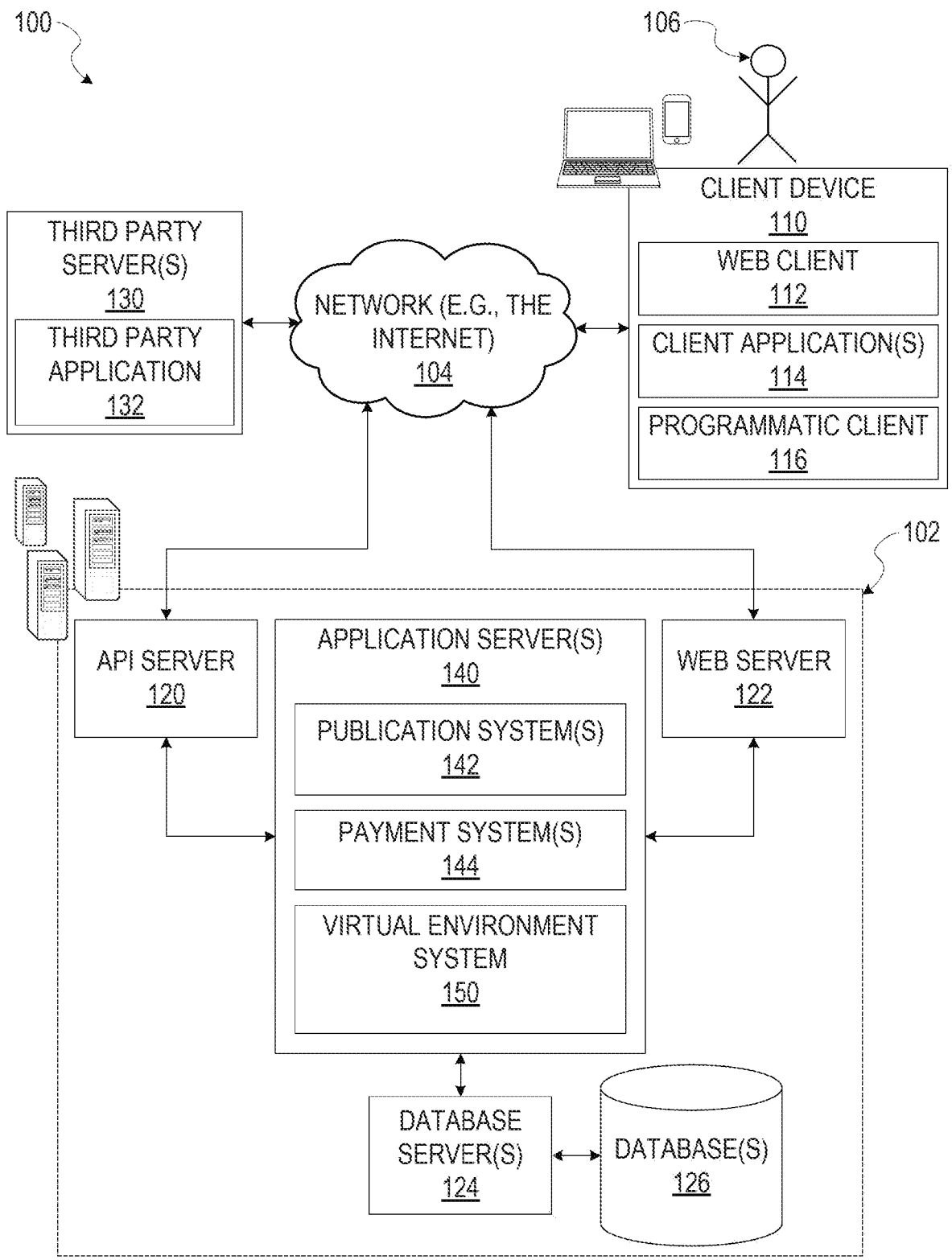
FIG. 1 is a block diagram illustrating a networked system, according to some example embodiments.

With reference to FIG. 1, an example embodiment of a high-level client-server-based network architecture 100 is shown. A networked system 102, in the example forms of a network-based publication or payment system, provides server-side functionality via a network 104 (e.g., the Internet or wide area network (WAN)) to one or more client devices 110. FIG. 1 illustrates, for example, a web client 112 (e.g., a browser, such as the Internet Explorer® browser developed by Microsoft® Corporation of Redmond, Wash. State), a client application 114, and a programmatic client 116 executing on the client device 110.

The client device 110 may comprise, but is not limited to, a mobile phone, desktop computer, laptop, portable digital assistants (PDAs), smart phones, tablets, virtual headsets, ultra-books, netbooks, laptops, multi-processor systems, microprocessor-based or programmable consumer electronics, game consoles, set-top boxes, or any other communication device that a user may utilize to access the networked system 102. In some embodiments, the client device 110 comprises a display module (not shown) to display information (e.g., in the form of user interfaces). In further embodiments, the client device 110 may comprise one or more of a touch screens, accelerometers, gyroscopes, cameras, microphones, global positioning system (GPS) devices, and so forth. The client device 110 may be a device of a user that is used to perform a transaction involving digital items within the networked system 102. In one embodiment, the networked system 102 is a network-based marketplace that responds to requests for product listings, publishes publications comprising item listings of products available on the network-based marketplace, and manages payments for these marketplace transactions. For example, one or more portions of the network 104 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, a wireless network, a WiFi network, a WiMax network, another type of network, or a combination of two or more such networks.

Each of the client devices 110 includes one or more applications (also referred to as "apps") such as, but not limited to, a web browser, messaging application, electronic mail (email) application, an e-commerce site application (also referred to as a marketplace application), and the like. In some embodiments, if the e-commerce site application is included in a given one of the client device 110, then this application is configured to locally provide the user interface and at least some of the functionalities with the application configured to communicate with the networked system 102, on an as needed basis, for data and/or processing capabilities not locally available (e.g., access to a database of items available for sale, to authenticate a user, to verify a method of payment). Conversely if the e-commerce site application is not included in the client device 110, the client device 110 may use its web browser to access the e-commerce site (or a variant thereof) hosted on the networked system 102.

One or more users 106 may be a person, a machine, or other means of interacting with the client device 110. In example embodiments, the user 106 is not part of the network architecture 100, but interacts with the network architecture 100 via the client device 110 or other means. For instance, the user 106 provides input (e.g., touch screen input or alphanumeric input) to the client device 110 and the input is communicated to the networked system 102 via the network 104. In this instance, the networked system 102, in response to receiving the input from the user 106, communicates information to the client device 110 via the network 104 to be presented to the user 106. In this way, the user 106 can interact with the networked system 102 using the client device 110.

An application program interface (API) server 120 and a web server 122 are coupled to, and provide programmatic and web interfaces respectively to, one or more application servers 140. The application servers 140 hosts one or more publication systems 142 and payment systems 144, each of which may comprise one or more modules or applications and each of which may be embodied as hardware, software, firmware, or any combination thereof. The application servers 140 are, in turn, shown to be coupled to one or more database servers 124 that facilitate access to one or more information storage repositories or database(s) 126. In an example embodiment, the databases 126 are storage devices that store information to be posted (e.g., publications or listings) to the publication system 142. The databases 126 may also store digital item information in accordance with example embodiments.

Additionally, a third party application 132, executing on third party server(s) 130, is shown as having programmatic access to the networked system 102 via the programmatic interface provided by the API server 120. For example, the third party application 132, utilizing information retrieved from the networked system 102, supports one or more features or functions on a website hosted by the third party. The third party website, for example, provides one or more promotional, marketplace, or payment functions that are supported by the relevant applications of the networked system 102.

The publication systems 142 provide a number of publication functions and services to users 106 that access the networked system 102. The payment systems 144 likewise provide a number of functions to perform or facilitate payments and transactions. While the publication system 142 and payment system 144 are shown in FIG. 1 to both form part of the networked system 102, it will be appreciated that, in alternative embodiments, each system 142 and 144 may form part of a payment service that is separate and distinct from the networked system 102. In some embodiments, the payment systems 144 may form part of the publication system 142.

The virtual environment system 150 provides virtual three-dimensional content that is displayed on a user device capable of viewing the three-dimensional content. The virtual environment system 150, upon detection of the user device, retrieves 3D content that corresponds to a session that a user is viewing. For example, the virtual environment system 150 may access the user 3D content from the databases 126, the third party servers 130, the publication system 142, and other sources. In some example embodiments, the virtual environment system 150 communicates with the publication systems 142 (e.g., accessing item listings) and payment system 144. In an alternative embodiment, the virtual environment system 150 may be a part of the publication system 142.

Further, while the client-server-based network architecture 100 shown in FIG. 1 employs a client-server architecture, the present inventive subject matter is of course not limited to such an architecture, and could equally well find application in a distributed, or peer-to-peer, architecture system, for example. The various publication system 142, payment system 144, and virtual environment system 150 could also be implemented as standalone software programs, which do not necessarily have networking capabilities.

The web client 112 accesses the various publication and payment systems 142 and 144 via the web interface supported by the web server 122. Similarly, the programmatic client 116 accesses the various services and functions provided by the publication and payment systems 142 and 144 via the programmatic interface provided by the API server 120. The programmatic client 116 may, for example, be a seller application (e.g., the Turbo Lister application developed by eBay® Inc., of San Jose, Calif.) to enable sellers to author and manage listings on the networked system 102 in an off-line manner, and to perform batch-mode communications between the programmatic client 116 and the networked system 102.

Figure 2:
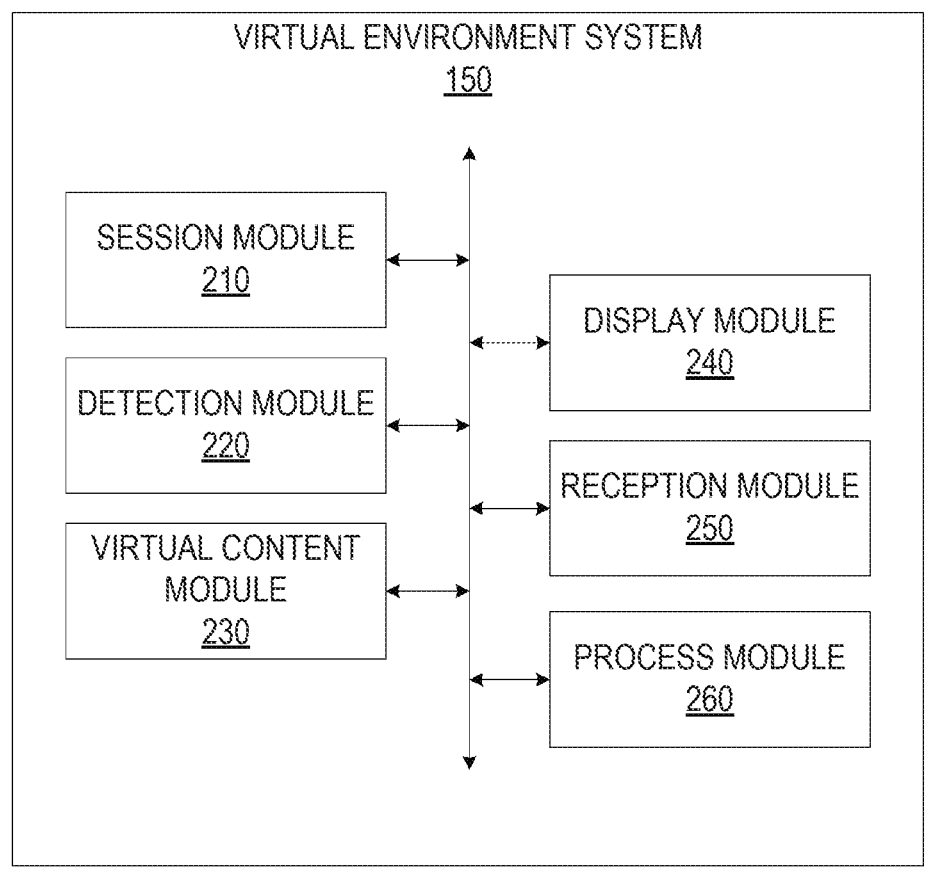
FIG. 2 is a block diagram illustrating components of a virtual environment system, according to some example embodiments.

FIG. 2 is a block diagram illustrating components of the virtual environment system 150, according to some example embodiments. The virtual environment system 150 is shown as including a session module 210, a detection module 220, a virtual content module 230, a display module 240, a reception module 250, and a process module 260, all configured to communicate with each other (e.g., via a bus, shared memory, or a switch). Any one or more of the modules described herein may be implemented using hardware (e.g., one or more processors of a machine) or a combination of hardware and software. For example, any module described herein may configure a processor (e.g., among one or more processors of a machine) to perform the operations described herein for that module. Moreover, any two or more of these modules may be combined into a single module, and the functions described herein for a single module may be subdivided among multiple modules. Furthermore, according to various example embodiments, modules described herein as being implemented within a single machine, database, or device may be distributed across multiple machines, databases, or devices.

In various example embodiments, the session module 210 is configured to cause presentation of a session that displays two-dimensional (2D) content. In some instances, the 2D content is of one or more items available for sale. In doing so, the session module 210 communicates with a first device of a user and presents the session on that device (e.g., client device 110). Example sessions may include browsing an item page of one or more items available for sale, viewing a website of a brick-and-mortar store, watching a video clip, and the like. Moreover, the session module 210 is further to cause presentation of the session based on user credentials of a user. For instance, a user provides the user credentials to log into a user account. Upon login to the user account, the session module 210 presents the session that displays the 2D content.

In various example embodiments, the detection module 220 detects a second device of the user that is able to display three-dimensional (3D) content of the one or more items available for sale. The second device of the user may be a virtual reality (VR) headset, a VR component of a mobile device, or any other device compatible with displaying 3D content. In further embodiments, the detection module 220 is to receive the user credentials from the second device of the user.

In various example embodiments, the virtual content module 230 retrieves the 3D content that corresponds to the 2D content for the session. The 3D content includes one or more 3D objects. For instance, the 3D content is of the one or more items available for sale, and each of the one or more items available for sale is represented as a 3D object. Additionally, in some instances, the 3D content will include a virtual environment for the session. In some instances, the virtual environment is used to present the 3D objects representative of the one or more items available for sale. The virtual environment may include a 3D item page, a 3D layout of a brick-and-mortar store, a 3D layout of a mall, and the like. The 3D item page depicts the 2D components of the item page in 3D form. For instance, instead of an image of the item, a 3D model of the item is presented in the 3D item page. The 3D layout of the brick-and-mortar store may depict the real-life layout of the brick-and-mortar store. Also, the 3D lay out of the mall may depict the real-life layout of a shopping mall. Therefore, in some instances, the one or more items available for sale will be arranged as 3D objects within the virtual environment in a manner that emulates their real-life counterparts, such as the brick and mortar store or the shopping mall.

In various example embodiments, the virtual content module 230 is further to retrieve the 3D content based on the user credentials. In other words, the same user credentials used to present the session that displays the 2D content is also used to retrieve or access the 3D content. In further embodiments, the 3D content is labeled as corresponding to the 2D content and is stored in a database, such as the database 126. Therefore, the virtual content module 230 retrieves the 3D content corresponding to the 2D content from the database 126.

Moreover, in some instances, the virtual content module 230 is further to retrieve the 3D content based on a location of the second device. For instance, the virtual content module 230 retrieves 3D content that depicts a layout of a brick-and-mortar store which is a pre-defined distance from the location of the second device. This allows for the user to view the 3D content pertaining to a local brick-and-mortar store familiar to the user. In this regard, the virtual content module 230 is further to identify the brick-and-mortar store within the pre-defined distance from the location of the second device.

In various example embodiments, the display module 240 causes display of the 3D content on the second device of the user. Moreover, the 3D content displayed on the second device of the user is selectable by the user to perform user interactions with the 3D content. Further, since the 3D content depicts the one or more items available for sale as 3D objects, the interactions with the 3D content include selecting the 3D objects. For example, in order to select the 3D objects, the user is able to move the 3D objects representative of the one or more items available for sale to a virtual shopping cart. The interactions with the 3D content also include indicating a request to purchase one of the one or more items. For instance, a user performs a gesture with respect to a 3D object, the gesture corresponding to a request to purchase the item (e.g., shaking the item, flipping the item, and the like). The interactions with the 3D content may further include zooming in or navigating the 3D content, such as the virtual environment for the session. In some instances, the display module 240 also causes display of a set of controls that enable the user to perform interactions with the 3D content. For example, the set of controls may allow the user to rotate the 3D content and view the 3D content from multiple angles. Moreover, the interactions with the 3D content may be performed on the second device of the user.

In various example embodiments, the reception module 250 is configured to receive an indication of user performed interactions with the 3D content. The indication of the user performed interaction may be sent from the second device to the reception module 250. The indications may include receiving a selection of the 3D objects from the displayed 3D content. For example, the user, viewing the 3D content within the virtual environment, may select one or more 3D objects from the 3D content. As stated above, the user may indicate selection of the one or more 3D objects by performing a gesture (e.g., a gesture of picking up the 3D object and moving it to a virtual shopping cart) on the second device. Moreover, the 3D objects may be displayed as being arranged in a virtual layout of a brick-and-mortar store that the user is familiar with. The indications may also include receiving a request to purchase an item corresponding to a 3D object from the displayed 3D content. The user may send the request by performing a gesture (e.g., a gesture of shaking the 3D object, flipping the 3D object, and the like) on the second device.

In various example embodiments, the reception module 250 is further to receive a location of the second device of the user. The location of the second device of the user may be indicated by geographical coordinates. Moreover, a GPS receiver embodied within the second device is able to identify the location of the second device and send the location to the reception module 250.

In further embodiments, the reception module 250 is to receive user credentials from the first device of the user. The user credentials include user password and login information. Moreover, the user credentials are used to login to a user account of the user. In some instances, the user account of the user is used to access the session that displays the 2D content. Moreover, the 3D content of the session is displayed to the user based on the user credentials.

In various example embodiments, the process module 260 is configured to process the received indication of the user performed interactions with the 3D content. In some instances, the process module 260 processes the user performed interactions with the user account of the user. In this regard, the process module 260 is further to add items corresponding to the selected 3D objects to a virtual shopping cart (e.g., 3D shopping cart) that is associated with the account of the user. In some instances, the process module 260 is further to debit or to subtract a purchase price of the item that the user has requested to purchase from an account of the user, the item corresponding to the 3D object from the displayed 3D content. Therefore, in some instances, the process module 260 is to process the user performed interactions based on the received user credentials.

In various example embodiments, the display module 240 is configured to cause display, on the first device of the user, of a user interface that includes a result that depicts the user performed interactions as being processed for the session (e.g., transmit instructions and information to cause the display on the first device). For example, the display module 240 in some instances is configured to cause display of the items corresponding to the 3D objects as being added to the virtual shopping cart (e.g., transmit instructions and information to cause the display on the second device). As another example, the display module 240 is to cause display of the purchase price of the purchased item as being debited from the account of the user. Also, the display module 240 is to cause display of the purchased item as being sold to the user. In further embodiments, the display module 240 is configured to cause display, on the second device of the user, a user interface that depicts the user performed interactions as being processed for the session.

Figure 3:
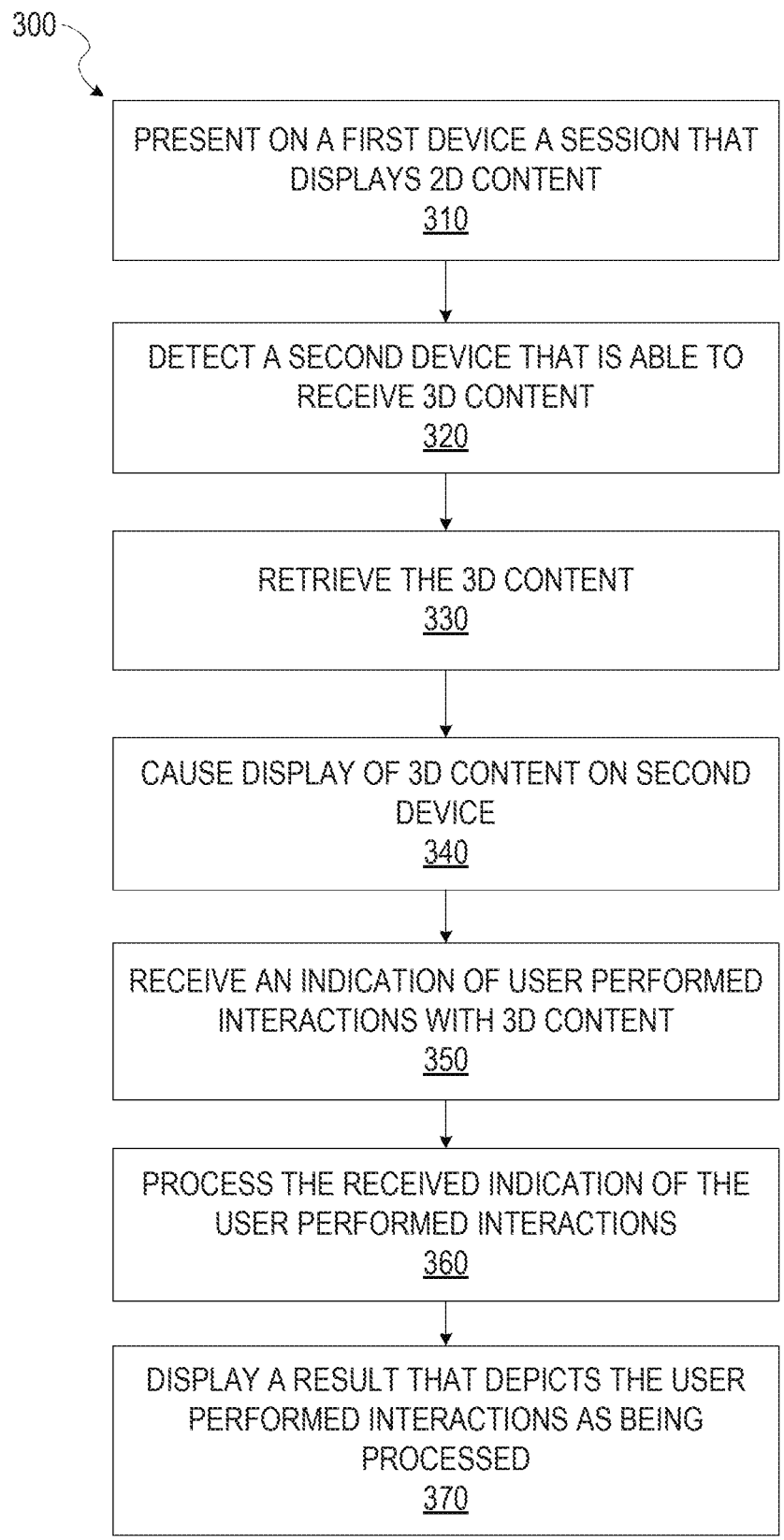
FIGS. 3-6 are flowcharts illustrating operations of the virtual environment system in performing a method of displaying 3D content, according to some example embodiments.

FIG. 3-6 are flowcharts illustrating operations of the virtual environment system 150 in performing a method 300 of displaying 3D content, according to some example embodiments. Operations in the method 300 may be performed by the virtual environment system 150, using modules described above with respect to FIG. 2. As shown in FIG. 3, the method 300 includes operations 310, 320, 330, 340, 350, 360, and 370.

At operation 310, the session module 210 causes presentation on a first device a session that displays 2D content of one or more items available for sale. As stated earlier, the session may include browsing an item page of one or more items available for sale, viewing a website of a brick-and-mortar store, watching a video clip, and the like.

At operation 320, the detection module 220 detects a second device that is able to receive 3D content of the one or more items available for sale. In some instances, the detection module 220 detects the second device by receiving a request from the second device to view 3D content. Moreover, the second device may include identical user credentials as those used in operation 310 as part of the request.

At operation 330, the virtual content module 230 retrieves 3D content that corresponds to the 2D content for the session. For instance, the 3D content may be of the one or more items available for sale. Additionally, the virtual content module 230 retrieves 3D content which includes a virtual environment for the session.

At operation 340, the display module 240 causes display of the 3D content on the second device. Moreover, the 3D content is selectable by the user to perform interactions with the 3D content. For example, the user may select 3D objects from among the 3D content. As another example, the user may zoom in on the 3D content, or the user may navigate through the 3D content. In some instances, the display module 240 is further to cause display a set of controls that enable to the user to perform interactions with the 3D content. The set of controls enable the user to rotate and view the 3D content from one or more angles.

At operation 350, the reception module 250 receives, from the second device, an indication of user performed interactions with the 3D content. For example, the reception module 250 may receive a user selection of the 3D objects from among the 3D content.

At operation 360, the process module 260 processes the received indication of the user performed interactions with the 3D content, as further explained below.

At operation 370, the display module 240 causes display of a user interface that includes a result that depicts the user performed interactions as being processed for the session, as further explained below.

Figure 4:
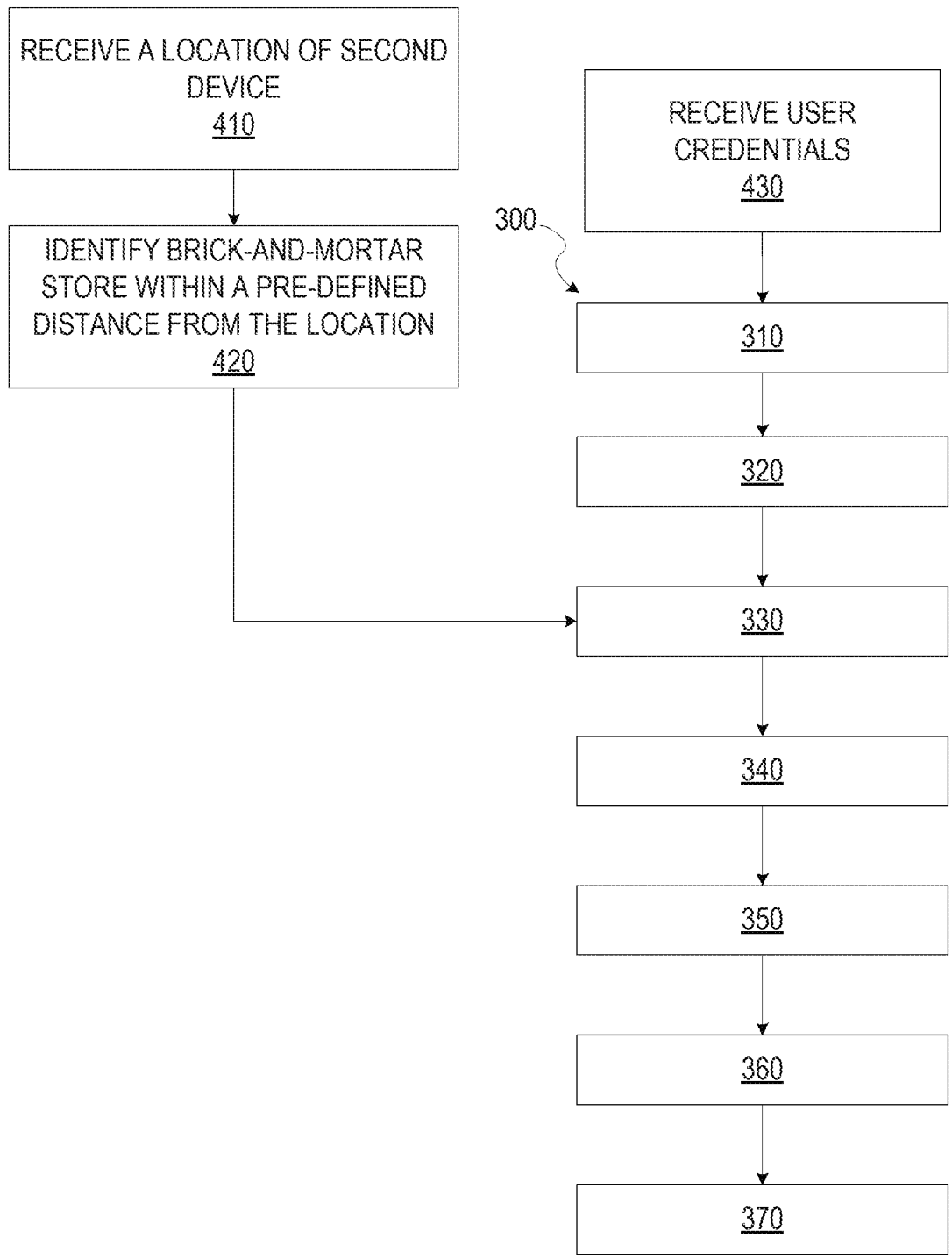

As shown in FIG. 4, the method 300 may include one or more of operations 410, 420, and 430. Operations 410 and 420 may be performed prior to the operation 330. Operation 430 may be performed prior to the operation 310.

At operation 410, the reception module 250 receives a location of the second device. The location of the second device includes GPS coordinates of the second device. The GPS coordinates of the second device is identified using a GPS received embodied on the second device. The location of the second device may also include a physical address.

At operation 420, the virtual content module 230 identifies a brick-and-mortar store within a pre-defined distance from the location of the second device. In doing so, the virtual content module 230 retrieves a list of brick-and-mortar stores that are within the pre-defined distance from the identified location of the second device. For example, the virtual content module 230 analyzes a map that includes the location the second device and retrieves, from the map, brick-and-mortar stores that are identified as being within the pre-defined distance from the location of the second device.

At operation 430, the reception module 250 receives user credentials pertaining to the user. The user credentials include user password and login information. Moreover, the user credentials are used to login to a user account of the user. The user account of the user is thereafter used to access the session that displays the 2D content and the 3D content. The reception module 250 receives the user credentials from either the first device of the user or the second device of the user.

Figure 5:
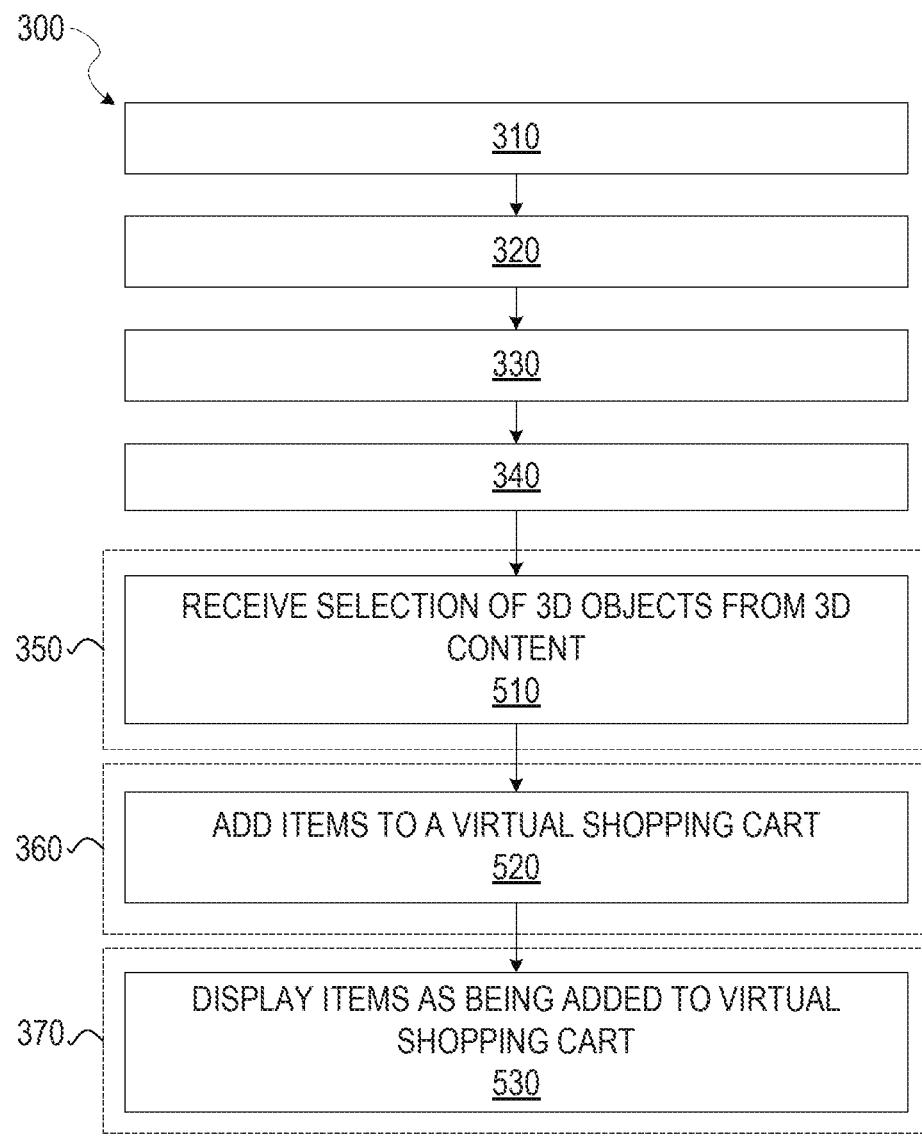

At shown in FIG. 5, the method 300 may include one or more of operations 510, 520, and 530. Operation 510 may be included as part of operation 350. Operation 520 may be included as part of operation 360. Operation 530 may be included as part of operation 370.

At operation 510, the reception module 250 receives a selection of 3D objects from the 3D content displayed. In some instances, the 3D objects represent one or more items. The user is able to indicate the selection by performing a gesture with respect to the 3D objects. For example, the user is able to indicate a selection of a 3D object by moving the 3D object to a further 3D object, the further 3D object representing a virtual shopping cart. Alternatively, the user may indicate a selection of a 3D object by performing a grabbing gesture with respect to the 3D object.

At operation 520, the process module 260 adds the items corresponding to the selected 3D objects to a virtual shopping cart (e.g., 3D shopping cart).

At operation 530, the display module 240 displays the items corresponding to the selected 3D objects as being added to the virtual shopping cart. In other words, the display module 240 causes display on the first device of the user the items corresponding to the 3D objects selected at operation 510 as being added to the virtual shopping cart. In some instances, items corresponding to the 3D objects are shown as being inside the virtual shopping cart.

Figure 6:
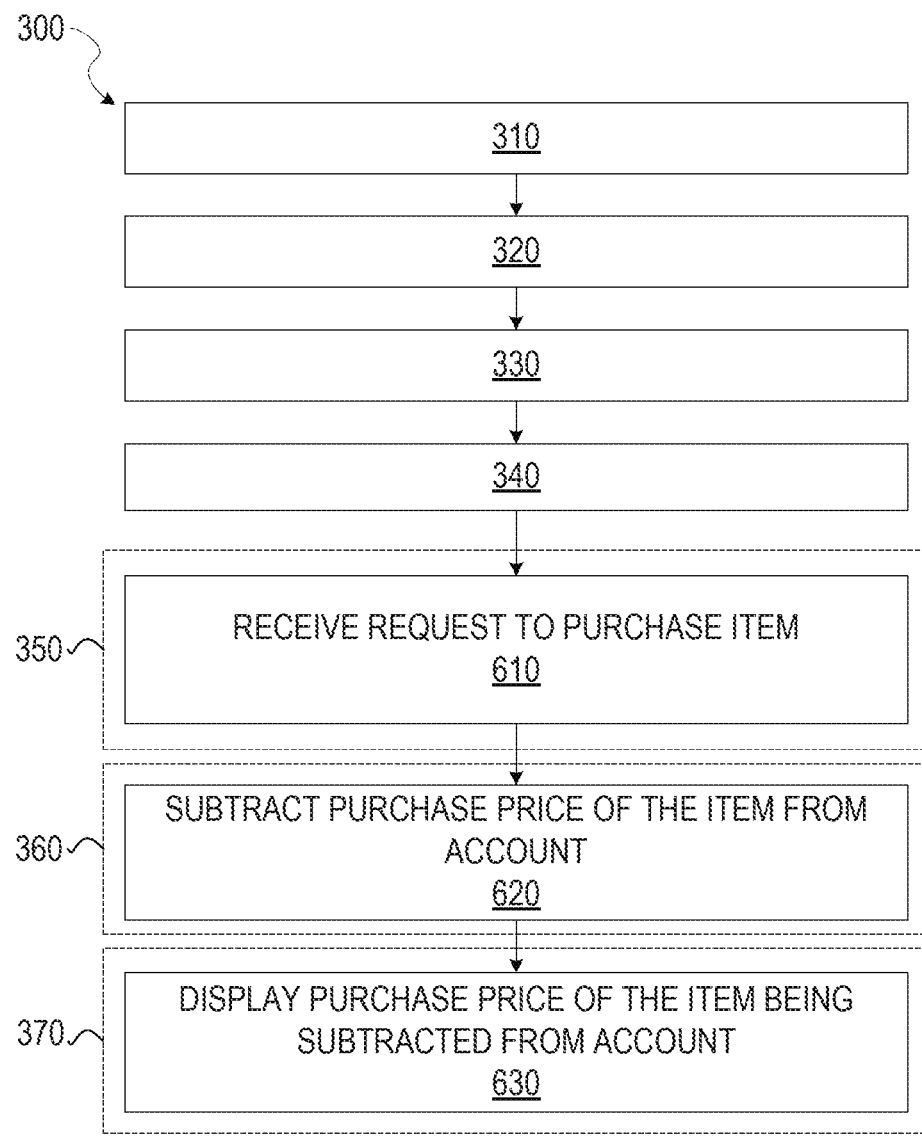

As shown in FIG. 6, the method 300 may include one or more of operations 610, 620, and 630. Operation 610 may be included as part of operation 350. Operation 620 may be included as part of operation 360. Operation 630 may be included as part of operation 370.

At operation 610, the reception module 250 receives a request to purchase an item corresponding to a 3D object from the displayed 3D content. The user is able to indicate the request by performing a gesture with respect to the 3D object. For example, the user may shake the 3D object, or flip the 3D object to send the request to purchase the item correspond to the 3D object.

At operation 620, the process module 260 subtracts a purchase price of the item from an account of the user. For example, the account of the user may be linked to a credit card of the user. Further, the process module 260 charges the credit card of the user for the purchase price of the item. Alternatively, the account of the user may have a certain amount of credits, and the process module 260 subtracts the purchase price of the item from the amount of credits linked to the account.

At operation 630, the display module 240 causes display of the purchase price of the item as being subtracted from the account of the user. In other words, the display module 240 causes display on the first device of the user the purchase price of the item as being subtracted from the account of the user, as result of the operation 620.

Figure 7:
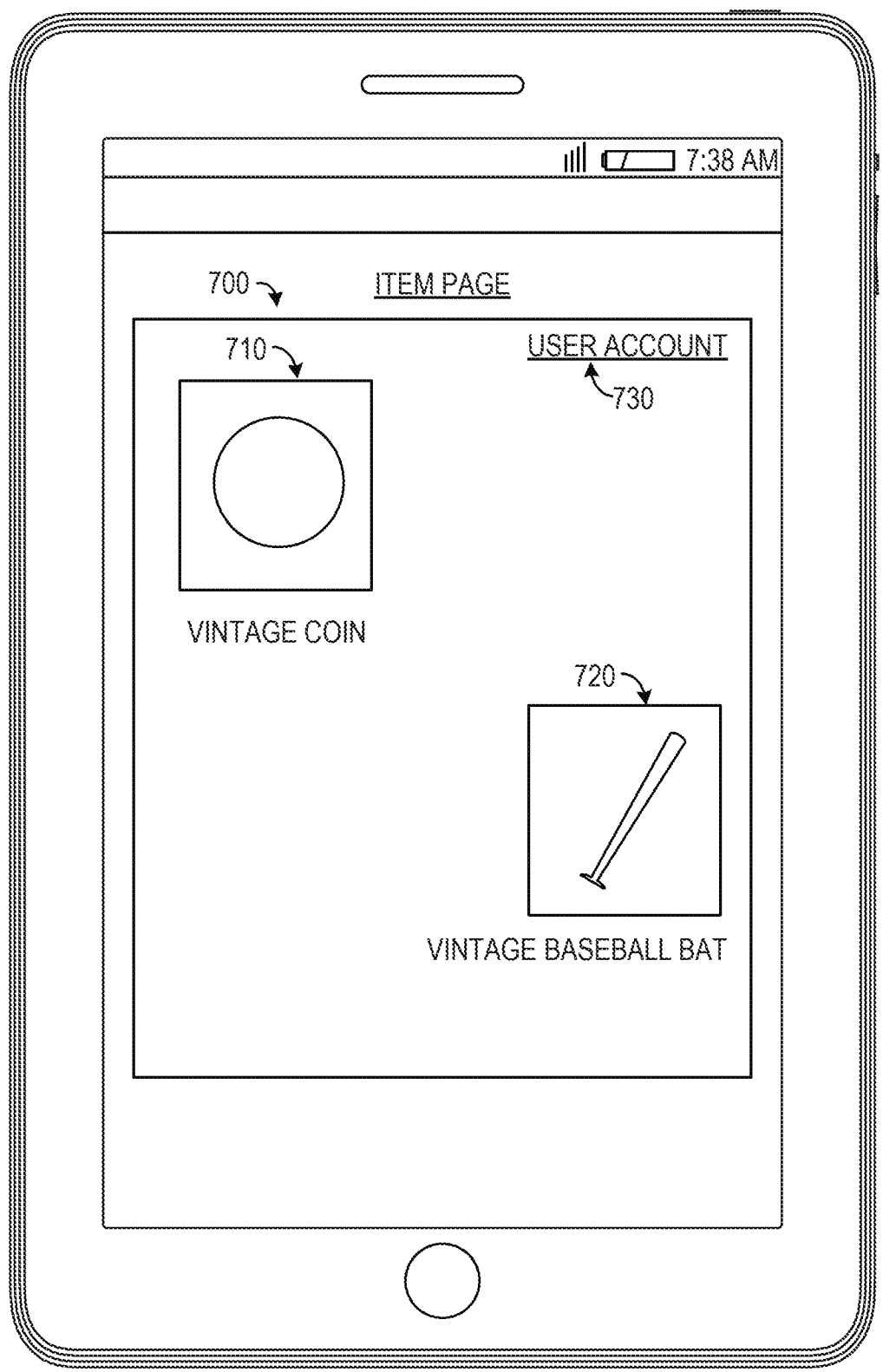
FIG. 7 is a block diagram illustrating an example user interface of an item page, according to some example embodiments.

FIG. 7 is a block diagram illustrating an example user interface of an item page 700, according to some example embodiments. The item page 700 includes an image corresponding to a first item 710 (e.g., vintage coin) available for sale and an image corresponding to a second item 720 (e.g., vintage baseball bat) available for sale. Moreover, the item page 700 is presented on a first client device as part of a session (e.g., operation 310 of FIG. 3). Also, a user operating the client device may be logged into a user account, as indicated by a description 730, in order to view the item page 700. The user may provide user credentials in order to log into the user account.

Figure 8:
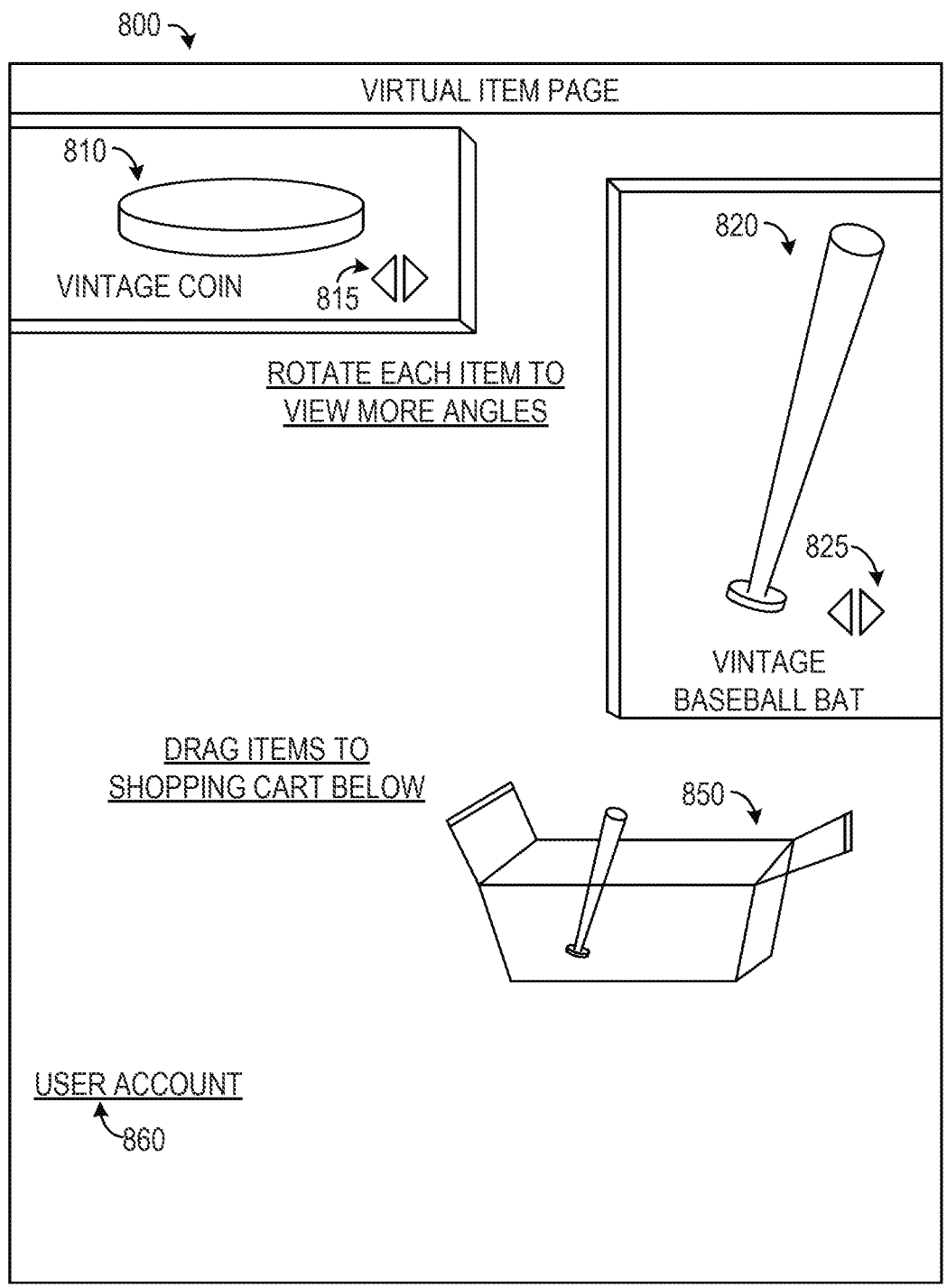
FIG. 8 is a block diagram illustrating an example user interface of a virtual item page, according to some example embodiments.

FIG. 8 is a block diagram illustrating an example user interface of a virtual item page 800, according to some example embodiments. The virtual item page 800 is presented on a second client device that is able to display three-dimensional content. The virtual item page 800 may be a virtual environment including 3D content that corresponds to the item page 700 of FIG. 7. Further, the virtual item page 800 includes 3D content that depicts the first item 710 and the second item 720 as 3D objects. For example, the virtual item page 800 includes a first 3D object 810 which depicts the image corresponding to the first item 710 of FIG. 7 in 3D form. Also, the virtual item page 800 includes a second 3D object 820 which depicts the image corresponding to the second item 720 of FIG. 7 in 3D form. The 3D content is further selectable by the user to perform interactions with the 3D content. For instance, the virtual item page 800 includes a first set of controls 815 that allow the user to rotate and view the first 3D object 810 (e.g., vintage coin). Also, the virtual item page 800 includes a second set of controls 825 that allow the user to rotate and view the second 3D object 820 (e.g., vintage baseball bat).

Also included in the virtual item page 800 is a virtual shopping cart 850 where the user may place the 3D objects displayed in the virtual item page 800. For example, the user may drag each of the 3D objects into the virtual shopping cart 850. As shown, the virtual shopping cart 850 includes the 3D object of the vintage baseball bat. Once the 3D objects are placed into the virtual shopping cart 850, these user interactions are sent from the second client device to the virtual environment system 150 to be processed by the virtual environment system 150 (e.g., operations 350 and 360 of FIG. 3). Moreover, the user may access the virtual item page 800 while logged into a user account, as indicated by the description 860.

Figure 9:
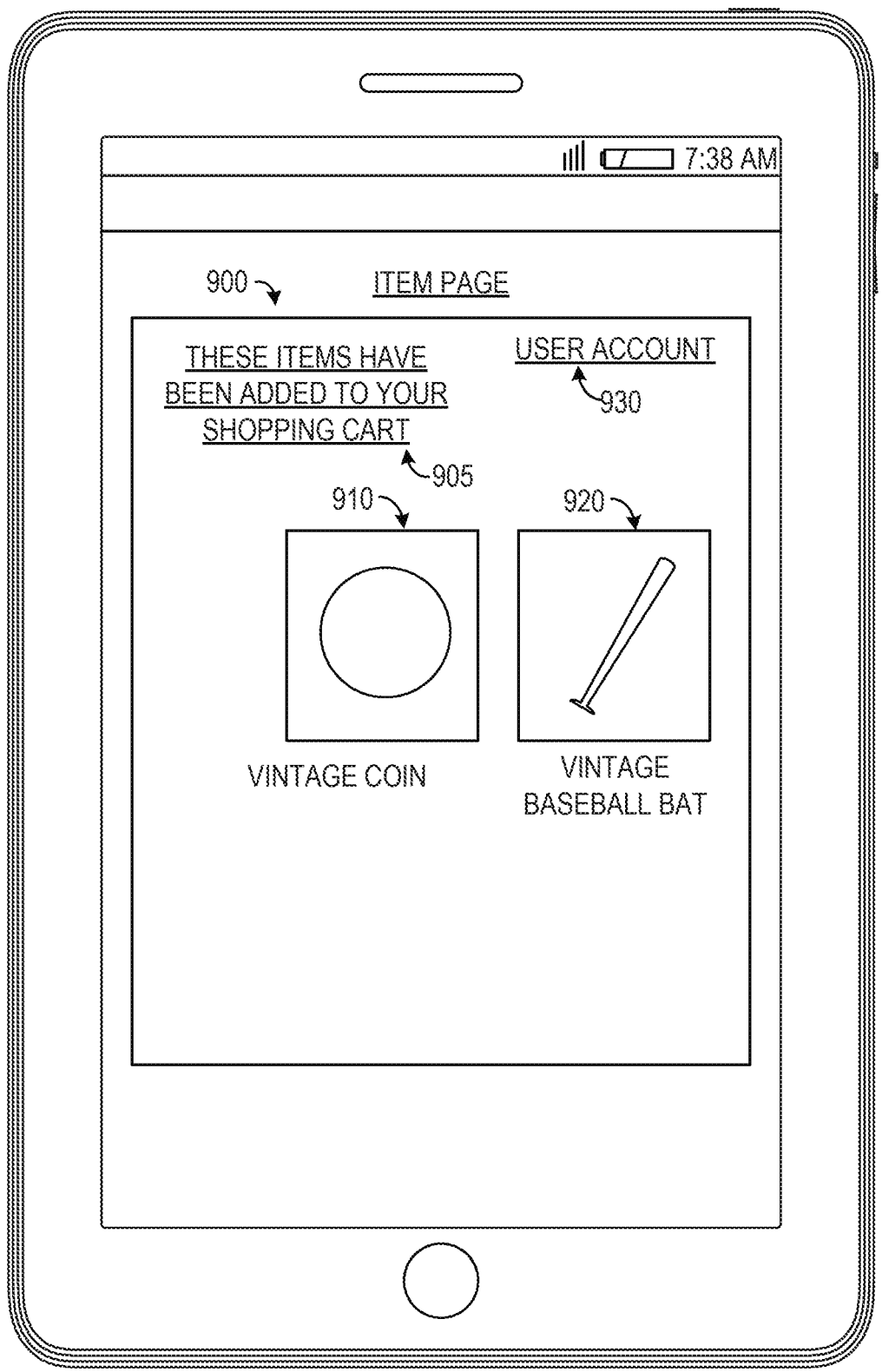
FIG. 9 is a block diagram illustrating an example user interface of an item page, according to some example embodiments.

FIG. 9 is a block diagram illustrating an example user interface of an item page 900, according to some example embodiments. The item page 900 is displayed on the first client device that was also used to display the item page 700 of FIG. 7. The item page 900 includes a result 905 that depicts the user performed interactions with the 3D objects as being processed. For instance, the result 905 indicates that both the first item 910 and the second item 920 have been added to the shopping cart as a result of the interactions performed by the user in the virtual item page 800. Moreover, an image corresponding to the first item 910 corresponds to the image corresponding to the first item 710 of FIG. 7 and the first 3D object 810 of FIG. 8. Likewise, an image corresponding to the second item 920 corresponds to the image corresponding to the second item 720 of FIG. 7 and the second 3D object 820 of FIG. 8. Moreover, the user may access the item page 900 while logged into a user account, as indicated by a description 930.

Modules, Components, and Logic

Certain embodiments are described herein as including logic or a number of components, modules, or mechanisms. Modules may constitute either software modules (e.g., code embodied on a machine-readable medium) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a Field-Programmable Gate Array (FPGA) or an Application Specific Integrated Circuit (ASIC). A hardware module may also include programmable logic or circuitry that is temporarily configured by software to perform certain operations. For example, a hardware module may include software executed by a general-purpose processor or other programmable processor. Once configured by such software, hardware modules become specific machines (or specific components of a machine) uniquely tailored to perform the configured functions and are no longer general-purpose processors. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software accordingly configures a particular processor or processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, with a particular processor or processors being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented modules may be located in a single geographic location (e.g., within a home environment, an office environment, or a server farm). In other example embodiments, the processors or processor-implemented modules may be distributed across a number of geographic locations.

Example Machine Architecture and Machine-Readable Medium

Figure 10:
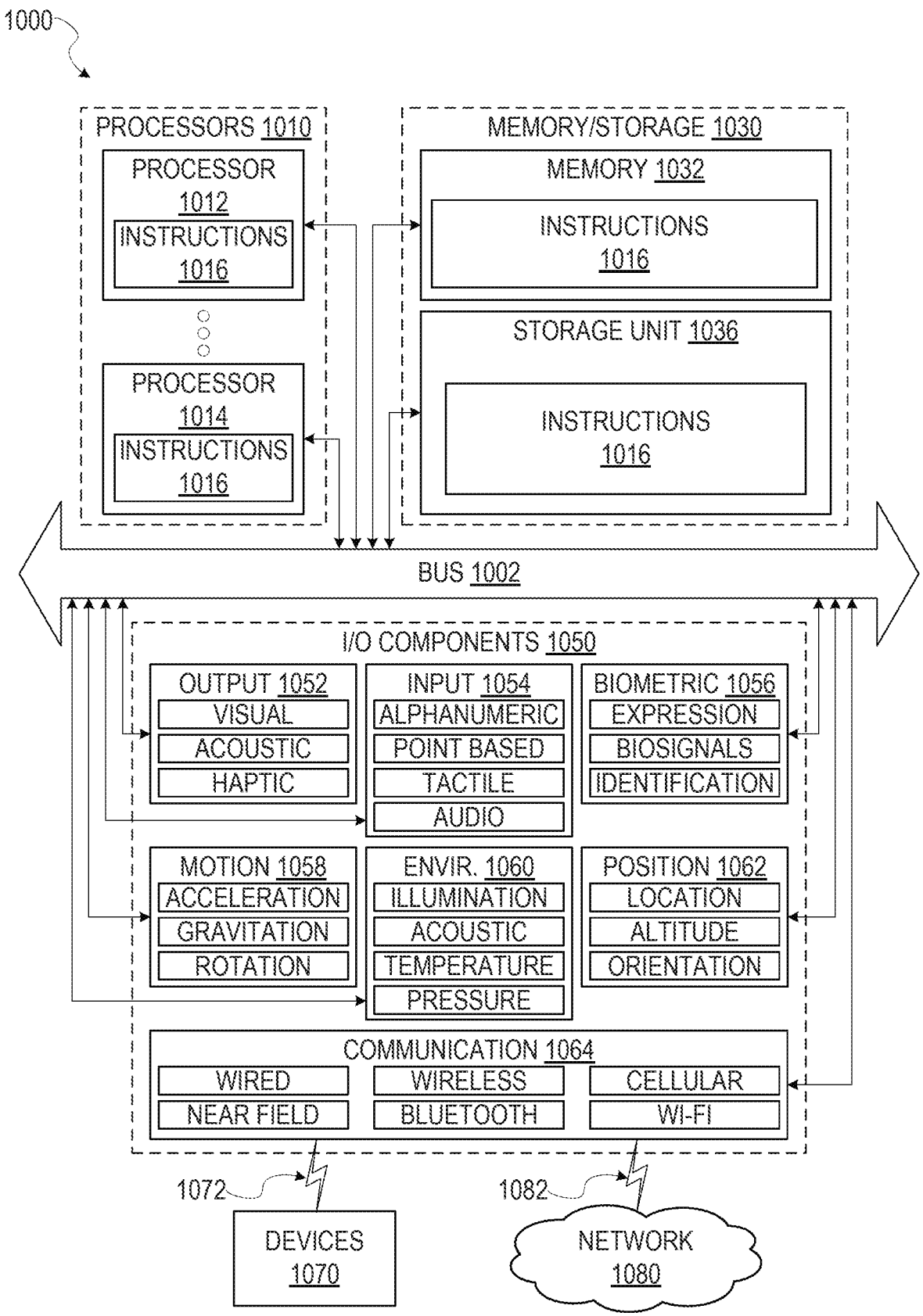
FIG. 10 illustrates a diagrammatic representation of a machine in the form of a computer system within which a set of instructions may be executed for causing the machine to perform any one or more of the methodologies discussed herein, according to an example embodiment.

FIG. 10 is a block diagram illustrating components of a machine 1000, according to some example embodiments, able to read instructions from a machine-readable medium (e.g., a machine-readable storage medium) and perform any one or more of the methodologies discussed herein. Specifically, FIG. 10 shows a diagrammatic representation of the machine 1000 in the example form of a computer system, within which instructions 1016 (e.g., software, a program, an application, an applet, an app, or other executable code) for causing the machine 1000 to perform any one or more of the methodologies discussed herein may be executed. For example the instructions may cause the machine to execute the flow diagrams of FIGS. 3-6. Additionally, or alternatively, the instructions may implement the modules described of FIG. 2, and so forth. The instructions transform the general, non-programmed machine into a particular machine programmed to carry out the described and illustrated functions in the manner described. In alternative embodiments, the machine 1000 operates as a standalone device or may be coupled (e.g., networked) to other machines. In a networked deployment, the machine 1000 may operate in the capacity of a server machine or a client machine in a server-client network environment, or as a peer machine in a peer-to-peer (or distributed) network environment. The machine 1000 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1016, sequentially or otherwise, that specify actions to be taken by machine 1000. Further, while only a single machine 1000 is illustrated, the term "machine" shall also be taken to include a collection of machines 1000 that individually or jointly execute the instructions 1016 to perform any one or more of the methodologies discussed herein.

The machine 1000 may include processors 1010, memory 1030, and I/O components 1050, which may be configured to communicate with each other such as via a bus 1002. In an example embodiment, the processors 1010 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, processor 1012 and processor 1014 that may execute instructions 1016. The term "processor" is intended to include multi-core processor that may comprise two or more independent processors (sometimes referred to as "cores") that may execute instructions contemporaneously. Although FIG. 10 shows multiple processors, the machine 1000 may include a single processor with a single core, a single processor with multiple cores (e.g., a multi-core process), multiple processors with a single core, multiple processors with multiples cores, or any combination thereof.

The memory/storage 1030 may include a memory 1032, such as a main memory, or other memory storage, and a storage unit 1036, both accessible to the processors 1010 such as via the bus 1002. The storage unit 1036 and memory 1032 store the instructions 1016 embodying any one or more of the methodologies or functions described herein. The instructions 1016 may also reside, completely or partially, within the memory 1032, within the storage unit 1036, within at least one of the processors 1010 (e.g., within the processor's cache memory), or any suitable combination thereof, during execution thereof by the machine 1000. Accordingly, the memory 1032, the storage unit 1036, and the memory of processors 1010 are examples of machine-readable media.

As used herein, "machine-readable medium" means a device able to store instructions and data temporarily or permanently and may include, but is not be limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store instructions 1016. The term "machine-readable medium" shall also be taken to include any medium, or combination of multiple media, that is capable of storing instructions (e.g., instructions 1016) for execution by a machine (e.g., machine 1000), such that the instructions, when executed by one or more processors of the machine 1000 (e.g., processors 1010), cause the machine 1000 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

The I/O components 1050 may include a wide variety of components to receive input, provide output, produce output, transmit information, exchange information, capture measurements, and so on. The specific I/O components 1050 that are included in a particular machine will depend on the type of machine. For example, portable machines such as mobile phones will likely include a touch input device or other such input mechanisms, while a headless server machine will likely not include such a touch input device. It will be appreciated that the I/O components 1050 may include many other components that are not shown in FIG. 10. The I/O components 1050 are grouped according to functionality merely for simplifying the following discussion and the grouping is in no way limiting. In various example embodiments, the I/O components 1050 may include output components 1052 and input components 1054. The output components 1052 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1054 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 1050 may include biometric components 1056, motion components 1058, environmental components 1060, or position components 1062 among a wide array of other components. For example, the biometric components 1056 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1058 may include acceleration sensor components (e.g., accelerometer), gravitation sensor components, rotation sensor components (e.g., gyroscope), and so forth. The environmental components 1060 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 1062 may include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1050 may include communication components 1064 operable to couple the machine 1000 to a network 1080 or devices 1070 via coupling 1082 and coupling 1072 respectively. For example, the communication components 1064 may include a network interface component or other suitable device to interface with the network 1080. In further examples, communication components 1064 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1070 may be another machine or any of a wide variety of peripheral devices (e.g., a peripheral device coupled via a Universal Serial Bus (USB)).

Moreover, the communication components 1064 may detect identifiers or include components operable to detect identifiers. For example, the communication components 1064 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals).

In addition, a variety of information may be derived via the communication components 1064, such as, location via Internet Protocol (IP) geo-location, location via Wi-Fi® signal triangulation, location via detecting a NFC beacon signal that may indicate a particular location, and so forth.

Transmission Medium

In various example embodiments, one or more portions of the network 1080 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, the network 1080 or a portion of the network 1080 may include a wireless or cellular network and the coupling 1082 may be a Code Division Multiple Access (CDMA) connection, a Global System for Mobile communications (GSM) connection, or other type of cellular or wireless coupling. In this example, the coupling 1082 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

The instructions 1016 may be transmitted or received over the network 1080 using a transmission medium via a network interface device (e.g., a network interface component included in the communication components 1064) and utilizing any one of a number of well-known transfer protocols (e.g., hypertext transfer protocol (HTTP)). Similarly, the instructions 1016 may be transmitted or received using a transmission medium via the coupling 1072 (e.g., a peer-to-peer coupling) to devices 1070. The term "transmission medium" shall be taken to include any intangible medium that is capable of storing, encoding, or carrying instructions 1016 for execution by the machine 1000, and includes digital or analog communications signals or other intangible medium to facilitate communication of such software.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A computer-implemented method, comprising:

maintaining a data store including a plurality of content representing a corresponding plurality of items, each of the plurality of content including corresponding two-dimensional image content and corresponding three-dimensional image content representing the respective items;

causing display of a two-dimensional image content on a first device, the two-dimensional image content representing a first item from the data store;

retrieving, from the data store, a three-dimensional image content corresponding to the two-dimensional image content representing the first item; and causing display of the three-dimensional image content representing the first item on a second device determined to be capable of displaying three-dimensional images on behalf of the first device, the three-dimensional image content caused to be displayed within a virtual brick and mortar environment selected based on a location of the second device, the three-dimensional image content selectable via the second device and a result of a selection of the three-dimensional image content caused to be displayed on the first device as part of the two-dimensional image content, wherein the three-dimensional image content includes a three-dimensional representation of a virtual shopping cart.

2. The method of claim 1, further comprising:

receiving the location of at least the second device.

3. The method of claim 1, wherein the plurality of items including the first item are available via a publication system corresponding to the virtual brick and mortar environment.

4. The method of claim 1, wherein the two-dimensional image content representing the first item represents the first item in two dimensions, and wherein the three-dimensional image content representing the first item represents the first item including the virtual brick and mortar environment in three dimensions.

5. The method of claim 1, wherein the virtual brick and mortar environment is selected based on the location of the second device being within a threshold distance of an actual brick and mortar environment represented by the virtual brick and mortar environment.

6. The method of claim 1, further comprising:
  retrieving the three-dimensional image content corresponding to the virtual brick and mortar environment that is selected based on the location.

7. The method of claim 1, wherein the two-dimensional image content representing the first item caused to be displayed on the first device further includes a two-dimensional representation of the virtual shopping cart.

8. A system comprising:
  at least one processor; and
  at least one memory including instructions that, when executed by the at least one processor, causes the system to perform operations comprising:
    maintaining a data store including a plurality of content representing a corresponding plurality of items, each of the plurality of content including corresponding two-dimensional image content and corresponding three-dimensional image content representing the respective items;
    causing display of a two-dimensional image content on a first device, the two-dimensional image content representing a first item from the data store;
    retrieving, from the data store, a three-dimensional image content corresponding to the two-dimensional image content representing the first item; and
    causing display of the three-dimensional image content representing the first item on a second device determined to be capable of displaying three-dimensional images on behalf of the first device, the three-dimensional image content caused to be displayed within a virtual brick and mortar environment selected based on a location of the second device, the three-dimensional image content selectable via the second device and a result of a selection of the three-dimensional image content caused to be displayed on the first device as part of the two-dimensional image content, wherein the three-dimensional image content includes a three-dimensional representation of a virtual shopping cart.

9. The system of claim 8, the operations further comprising:
  receiving the location of at least the second device.

10. The system of claim 8, wherein the plurality of items including the first item are available via a publication system corresponding to the virtual brick and mortar environment.

11. The system of claim 8, wherein the two-dimensional image content representing the first item represents the first item in two dimensions, and wherein the three-dimensional image content representing the first item represents the first item including the virtual brick and mortar environment in three dimensions.

12. The system of claim 8, wherein the virtual brick and mortar environment is selected based on the location of the second device being within a threshold distance of an actual brick and mortar environment represented by the virtual brick and mortar environment.

13. The system of claim 8, the operations further comprising:
  retrieving the three-dimensional image content corresponding to the virtual brick and mortar environment that is selected based on the location.

14. The system of claim 8, wherein the two-dimensional image content representing the first item caused to be displayed on the first device further includes a two-dimensional representation of the virtual shopping cart.

15. A non-transitory computer-readable storage medium including instructions that, when executed by at least one processor, causes a system to perform operations comprising:
  maintaining a data store including a plurality of content representing a corresponding plurality of items, each of the plurality of content including corresponding two-dimensional image content and corresponding three-dimensional image content representing the respective items;
  causing display of a two-dimensional image content on a first device, the two-dimensional image content representing a first item from the data store;
  retrieving, from the data store, a three-dimensional image content corresponding to the two-dimensional image content representing the first item; and
  causing display of the three-dimensional image content representing the first item on a second device determined to be capable of displaying three-dimensional images on behalf of the first device, the three-dimensional image content caused to be displayed within a virtual brick and mortar environment selected based on a location of the second device, the three-dimensional image content selectable via the second device and a result of a selection of the three-dimensional image content caused to be displayed on the first device as part of the two-dimensional image content, wherein the three-dimensional image content includes a three-dimensional representation of a virtual shopping cart.

16. The non-transitory computer-readable storage medium of claim 15, the operations further comprising:
  receiving the location of at least the second device.

17. The non-transitory computer-readable storage medium of claim 15, wherein the plurality of items including the first item are available via a publication system corresponding to the virtual brick and mortar environment.

18. The non-transitory computer-readable storage medium of claim 15, wherein the two-dimensional image content representing the first item represents the first item in two dimensions, and wherein the three-dimensional image content representing the first item represents the first item including the virtual brick and mortar environment in three dimensions.

* * * * *